(12) United States Patent
Parulan et al.

(10) Patent No.: US 12,250,291 B2
(45) Date of Patent: Mar. 11, 2025

(54) ENCRYPTED DATABASE SYSTEMS INCLUDING HOMOMORPHIC ENCRYPTION

(71) Applicant: Evernorth Strategic Development, Inc., St. Louis, MO (US)

(72) Inventors: Jeffrey Parulan, Tampa, FL (US); Floyd W. Shackelford, St. Louis, MO (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 450 days.

(21) Appl. No.: 17/523,555

(22) Filed: Nov. 10, 2021

(65) Prior Publication Data

US 2022/0150048 A1    May 12, 2022

Related U.S. Application Data

(60) Provisional application No. 63/111,984, filed on Nov. 10, 2020.

(51) Int. Cl.
*H04L 9/00* (2022.01)
*G06F 9/54* (2006.01)
(Continued)

(52) U.S. Cl.
CPC ............... *H04L 9/008* (2013.01); *G06F 9/54* (2013.01); *G06F 21/6227* (2013.01); *G06N 20/00* (2019.01); *H04L 9/0861* (2013.01)

(58) Field of Classification Search
CPC .... G06F 21/6227; G06F 21/6245; G06F 9/54; G06F 17/10; G06F 17/00; G06F 9/30007;
(Continued)

(56) References Cited

U.S. PATENT DOCUMENTS 9,509,494 B2    11/2016  Nita
9,819,650 B2    11/2017  Soon-Shiong
(Continued)

OTHER PUBLICATIONS

Shieldio, https://shieldio.com/#, accessed as early as Aug. 10, 2020.

*Primary Examiner* — Greg C Bengzon
(74) *Attorney, Agent, or Firm* — Miller Johnson

(57) ABSTRACT

A computerized method of querying a cryptographic data store includes maintaining an encryption configuration data structure. The method includes, in response to receiving a first query, identifying first data and consulting the encryption configuration data structure to identify a first encryption regime for the first data. The method includes, in response to the first encryption regime being a homomorphic encryption regime, determining an operation sequence specified by the first query and consulting the encryption configuration data structure to determine whether the operation sequence is supported by the first encryption regime. The method includes, in response to determining that the operation sequence is supported, commissioning homomorphic execution of the operation sequence on the first data to generate encrypted output data. The method includes, selectively returning the encrypted output data to the first requestor via the API in response to the first query.

21 Claims, 9 Drawing Sheets

(51) Int. Cl.
*G06F 21/62* (2013.01)
*G06N 20/00* (2019.01)
*H04L 9/08* (2006.01)

(58) Field of Classification Search
CPC ............... G06F 9/30003; G06F 9/3017; G06F 9/30178; G06F 9/30185; G06F 9/30189; G06F 9/30192; G06F 9/30196; G06F 9/4494; G06F 9/45516; G06F 17/11; G06F 21/60–604; G06F 21/62–629; G06N 20/00; H04L 9/008; H04L 9/0861; H04L 9/0894; H04L 9/14; H04L 63/0428–0492; H04L 63/20–205
See application file for complete search history.

(56) References Cited

U.S. PATENT DOCUMENTS

| | | | |
|---|---|---|---|
| 9,875,370 | B2 | 1/2018 | Antonopoulos |
| 10,404,668 | B2 | 9/2019 | Tissot |
| 10,783,263 | B2 | 9/2020 | Rane |
| 10,846,423 | B2 | 11/2020 | Rane |
| 10,880,275 | B2 | 12/2020 | Williams |
| 10,903,976 | B2 | 1/2021 | Williams |
| 10,972,251 | B2 | 4/2021 | Carr |
| 11,184,335 | B1 * | 11/2021 | Beloussov ........... H04L 63/0861 |
| 11,379,611 | B1 * | 7/2022 | Horesh .................... H04L 9/008 |
| 2006/0195402 | A1 * | 8/2006 | Malina ................ H04L 63/1441 |
| | | | 705/50 |
| 2013/0246813 | A1 * | 9/2013 | Mori ....................... H04L 9/008 |
| | | | 713/193 |
| 2014/0289503 | A1 * | 9/2014 | Toll ..................... G06F 9/30036 |
| | | | 712/226 |
| 2015/0295716 | A1 * | 10/2015 | Liu .......................... H04L 9/008 |
| | | | 713/191 |
| 2016/0132692 | A1 * | 5/2016 | Kerschbaum ....... G06F 21/6227 |
| | | | 713/189 |
| 2017/0272209 | A1 * | 9/2017 | Yanovsky .......... H03M 13/1515 |
| 2017/0344646 | A1 * | 11/2017 | Antonopoulos ...... H04L 63/205 |
| 2018/0219842 | A1 * | 8/2018 | Bellala .................... H04L 67/12 |
| 2018/0375639 | A1 * | 12/2018 | Lauter ..................... H04L 9/008 |
| 2018/0375640 | A1 * | 12/2018 | Laine ...................... H04L 9/008 |
| 2019/0007197 | A1 * | 1/2019 | Laine .................... H04L 9/3093 |
| 2019/0036678 | A1 * | 1/2019 | Ahmed .................... H04L 9/008 |
| 2019/0156051 | A1 * | 5/2019 | Beier ..................... G06F 21/602 |
| 2019/0386814 | A1 * | 12/2019 | Ahmed .................... H04L 9/008 |
| 2020/0151356 | A1 * | 5/2020 | Rohloff ............... G06F 21/6227 |
| 2020/0186325 | A1 * | 6/2020 | Anderson ............... H04L 9/302 |
| 2020/0213079 | A1 * | 7/2020 | Kreeger .................. H04L 9/008 |
| 2020/0265165 | A1 * | 8/2020 | Stefan ................. G06F 21/6245 |
| 2020/0320206 | A1 | 10/2020 | Cammarota |
| 2021/0104304 | A1 * | 4/2021 | Davidovics ............. H04L 67/10 |
| 2021/0117567 | A1 * | 4/2021 | Braghin ............... G06F 21/6245 |
| 2021/0182064 | A1 * | 6/2021 | Kara ................... G06F 9/30007 |
| 2021/0226951 | A1 * | 7/2021 | Goldstein ........... H04L 63/0884 |
| 2021/0256162 | A1 * | 8/2021 | Liphardt ............. G06F 21/6245 |
| 2021/0319128 | A1 * | 10/2021 | Salomon ............. G06F 21/6218 |
| 2022/0019663 | A1 * | 1/2022 | Stapleton ................. H04L 9/008 |
| 2022/0045841 | A1 * | 2/2022 | Keith, Jr. ................ G06V 40/20 |

* cited by examiner

ENCRYPTED DATABASE SYSTEMS INCLUDING HOMOMORPHIC ENCRYPTION

CROSS-REFERENCE TO RELATED APPLICATIONS

This application claims the benefit of U.S. Provisional Application No. 63/111,984, filed Nov. 10, 2020, the entire disclosure of which is incorporated by reference.

FIELD

The present disclosure relates to database systems and more particular to encrypted database architectures that integrate homomorphic encryption.

BACKGROUND

Homomorphic encryption is a form of encryption that allows for computations to be performed on ciphertexts without first decrypting the ciphertexts. The computations generate encrypted results that, when decrypted, provide the same value as the result that would occur if the ciphertexts were decrypted prior to performing the computations.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computerized method of querying a cryptographic data store includes maintaining an encryption configuration data structure in a non-transitory computer-readable medium. The method includes receiving a first query from a first requestor via an application programming interface (API). The method includes identifying first data required for the first query. The method includes determining, by consulting the encryption configuration data structure, a first encryption regime for the first data. The first encryption regime is one of a symmetric encryption regime, an asymmetric encryption regime, a plaintext regime, and a homomorphic encryption regime. The method includes, in response to the first encryption regime being a homomorphic encryption regime, determining an operation sequence specified by the first query for performance on the first data and determining, by consulting the encryption configuration data structure, whether the operation sequence is supported by the first encryption regime. The method includes, in response to determining that the operation sequence is supported, commissioning homomorphic execution of the operation sequence on the first data to generate encrypted output data. The method includes, in response to determining that the operation sequence is not supported, selectively commissioning decryption of the first data, execution of the operation sequence on the decrypted data to generate unencrypted output data, and re-encryption of the unencrypted output data to generate encrypted output data. The method includes, selectively returning the encrypted output data to the first requestor via the API in response to the first query.

In other features, the method includes ingesting source data, prior to receiving the first query, by determining, by consulting the encryption configuration data structure, a specified encryption regime for the source data. The specified encryption regime is one of a symmetric encryption regime, an asymmetric encryption regime, a plaintext regime, and a homomorphic encryption regime. The method includes, in response to the specified encryption regime being a homomorphic encryption regime, encrypting the source data with a first key to generate the first data.

In other features, the method includes, in response to the specified encryption regime being a symmetric encryption regime, encrypting the source data with a symmetric key to generate the first data. The method includes, in response to the specified encryption regime being an asymmetric encryption regime, encrypting the source data with a public key to generate the first data. The public key is paired with a private key. The method includes, in response to the specified encryption regime being a plaintext regime, selectively modifying the source data by applying extract, transform, and load actions and storing the source data, as modified, as the first data. In other features, the source data originated with a first party. The first party controls the first key, the symmetric key, and the private key. The method further includes selectively transmitting the first data to a third party. In other features, the transmitting the first data to the third party includes withholding the first key, the symmetric key, and the private key from the third party.

In other features, the source data originated with a first party. The first party controls the first key. The method further includes selectively transmitting the first data to a third party. In other features, the transmitting the first data to the third party includes withholding the first key from the third party. In other features, the transmitting the first data to the third party includes selectively providing an evaluation key related to the first key to the third party. In other features, the homomorphic execution of the operation sequence is performed by the third party and the decryption of the first data is performed by the first party.

In other features, the method includes selectively transmitting a request to an authentication, authorization, and accounting (AAA) service. The request specifies the first requestor and the first data. The method includes, in response to a successful authorization response by the AAA service, decrypting the encrypted output data and returning the decrypted output data to the first requestor via the API in response to the first query. In other features, the operation sequence encodes a trained machine learning model. The encrypted output data represents a predicted outcome from the trained machine learning model in response to the first data. In other features, the trained machine learning model is encoded using homomorphic operations.

In other features, the method includes, in response to receiving a change request specifying second data and a subsequent encryption regime, determining, by consulting the encryption configuration data structure, an existing encryption regime for the second data. The existing encryption regime is one of a symmetric encryption regime, an asymmetric encryption regime, a plaintext regime, and a homomorphic encryption regime. The method includes, in response to the existing encryption regime being a symmetric encryption regime, an asymmetric encryption regime, or a homomorphic encryption regime, decrypting the second data and updating the encryption configuration data structure to reflect the subsequent encryption regime for the second data. In other features, the method includes, subsequent to decrypting the second data, in response to the subsequent encryption regime being a symmetric encryption regime, an asymmetric encryption regime, or a homomorphic encryption regime, encrypting the decrypted second data according to the subsequent encryption regime.

A cryptographic storage system includes memory hardware configured to store instructions and processing hardware configured to execute the instructions stored by the memory hardware. The instructions include maintaining an encryption configuration data structure. The instructions include receiving a first query from a first requestor via an application programming interface (API). The instructions include identifying first data required for the first query. The instructions include determining, by consulting the encryption configuration data structure, a first encryption regime for the first data. The first encryption regime is one of a symmetric encryption regime, an asymmetric encryption regime, a plaintext regime, and a homomorphic encryption regime. The instructions include, in response to the first encryption regime being a homomorphic encryption regime, determining an operation sequence specified by the first query for performance on the first data and determining, by consulting the encryption configuration data structure, whether the operation sequence is supported by the first encryption regime. The instructions include, in response to determining that the operation sequence is supported, commissioning homomorphic execution of the operation sequence on the first data to generate encrypted output data. The instructions include, in response to determining that the operation sequence is not supported, selectively commissioning decryption of the first data, execution of the operation sequence on the decrypted data to generate unencrypted output data, and re-encryption of the unencrypted output data to generate encrypted output data. The instructions include selectively returning the encrypted output data to the first requestor via the API in response to the first query.

A non-transitory computer-readable medium includes instructions executable by processor hardware. The instructions include maintaining an encryption configuration data structure. The instructions include receiving a first query from a first requestor via an application programming interface (API). The instructions include identifying first data required for the first query. The instructions include determining, by consulting the encryption configuration data structure, a first encryption regime for the first data. The first encryption regime is one of a symmetric encryption regime, an asymmetric encryption regime, a plaintext regime, and a homomorphic encryption regime. The instructions include, in response to the first encryption regime being a homomorphic encryption regime, determining an operation sequence specified by the first query for performance on the first data and determining, by consulting the encryption configuration data structure, whether the operation sequence is supported by the first encryption regime. The instructions include, in response to determining that the operation sequence is supported, commissioning homomorphic execution of the operation sequence on the first data to generate encrypted output data. The instructions include, in response to determining that the operation sequence is not supported, selectively commissioning decryption of the first data, execution of the operation sequence on the decrypted data to generate unencrypted output data, and re-encryption of the unencrypted output data to generate encrypted output data. The instructions include selectively returning the encrypted output data to the first requestor via the API in response to the first query.

In other features, the instructions further include ingesting source data, prior to receiving the first query, by determining, by consulting the encryption configuration data structure, a specified encryption regime for the source data. The specified encryption regime is one of a symmetric encryption regime, an asymmetric encryption regime, a plaintext regime, and a homomorphic encryption regime. The instructions include, in response to the specified encryption regime being a homomorphic encryption regime, encrypting the source data with a first key to generate the first data. The instructions include, in response to the specified encryption regime being a symmetric encryption regime, encrypting the source data with a symmetric key to generate the first data. The instructions include, in response to the specified encryption regime being an asymmetric encryption regime, encrypting the source data with a public key to generate the first data. The public key is paired with a private key. The instructions include, in response to the specified encryption regime being a plaintext regime, selectively modifying the source data by applying extract, transform, and load actions and storing the source data, as modified, as the first data.

In other features, the source data originated with a first party. The first party controls the first key, the symmetric key, and the private key. The instructions further include selectively transmitting the first data to a third party. The transmitting the first data to the third party includes withholding the first key, the symmetric key, and the private key from the third party.

A computerized method of modifying encrypted data using homomorphic encryption includes obtaining a data modification request, accessing data associated with the data modification request, and determining an encryption schema corresponding to the data modification request. The method also includes, in response to determining that the data modification request corresponds to a homomorphic encryption schema, performing one or more homomorphic encryption operations on the accessed data according to the data modification request, while the accessed data remains encrypted. The method further includes, in response to determining that the data modification request corresponds to a standard encryption schema, performing a standard encryption or decryption operation on the accessed data according to the data modification request, and in response to determining that the data modification request corresponds to a cleartext schema, modifying the accessed data according to the data modification request without performing encryption or decryption on the accessed data.

In various implementations, performing a standard encryption or decryption operation includes decrypting the accessed data, modifying the decrypted data according to the data modification request, and encrypting the modified data. In various implementations, performing one or more homomorphic encryption operations includes obtaining a column index for a homomorphic encryption portion of the accessed data, performing the one or more homomorphic encryption operations on a column of the accessed data corresponding to the obtained column index, and storing the accessed data in a homomorphic encryption format after performing the one or more homomorphic encryption operations.

In various implementations, the one or more homomorphic encryption operations include at least one of an addition operation, a subtraction operation, an equal comparison operation, a greater than comparison operation, and a less than comparison operation. In various implementations, the column of the accessed data corresponding to the obtained column index includes credit limit data. In various implementations, the accessed data includes at least one of name data, address data, age data, social security number data, and credit limit data.

In various implementations, performing a standard encryption or decryption operation includes performing a standard encryption or decryption operation via a high-speed encryption/decryption engine in communication with a client browser in a client side encryption configuration. In various implementations, performing a standard encryption or decryption operation includes performing a standard encryption or decryption operation via a high-speed encryption/decryption engine in communication with a database controller in a server side encryption configuration.

Further areas of applicability of the present disclosure will become apparent from the detailed description, the claims, and the drawings. The detailed description and specific examples are intended for purposes of illustration only and are not intended to limit the scope of the disclosure.

DETAILED DESCRIPTION

Introduction

Encrypting data while it is stored (sometimes referred to as "data at rest") reduces the risk of data being stolen in a usable form in the event of a security breach. However, when data is used or loaded into a different system, the data generally needs to be decrypted. This decrypted data is more vulnerable to a security breach. Homomorphic encryption presents a solution to this conundrum by allowing data to be encrypted even while operations are being performed on the data. The operations may generate directly usable information and/or may produce encrypted results. When encrypted results are generated, they can be decrypted to obtain the desired information. Keeping data encrypted, even while in use, reduces the exposure of important data to a security breach.

High-Volume Pharmacy

Figure 1:
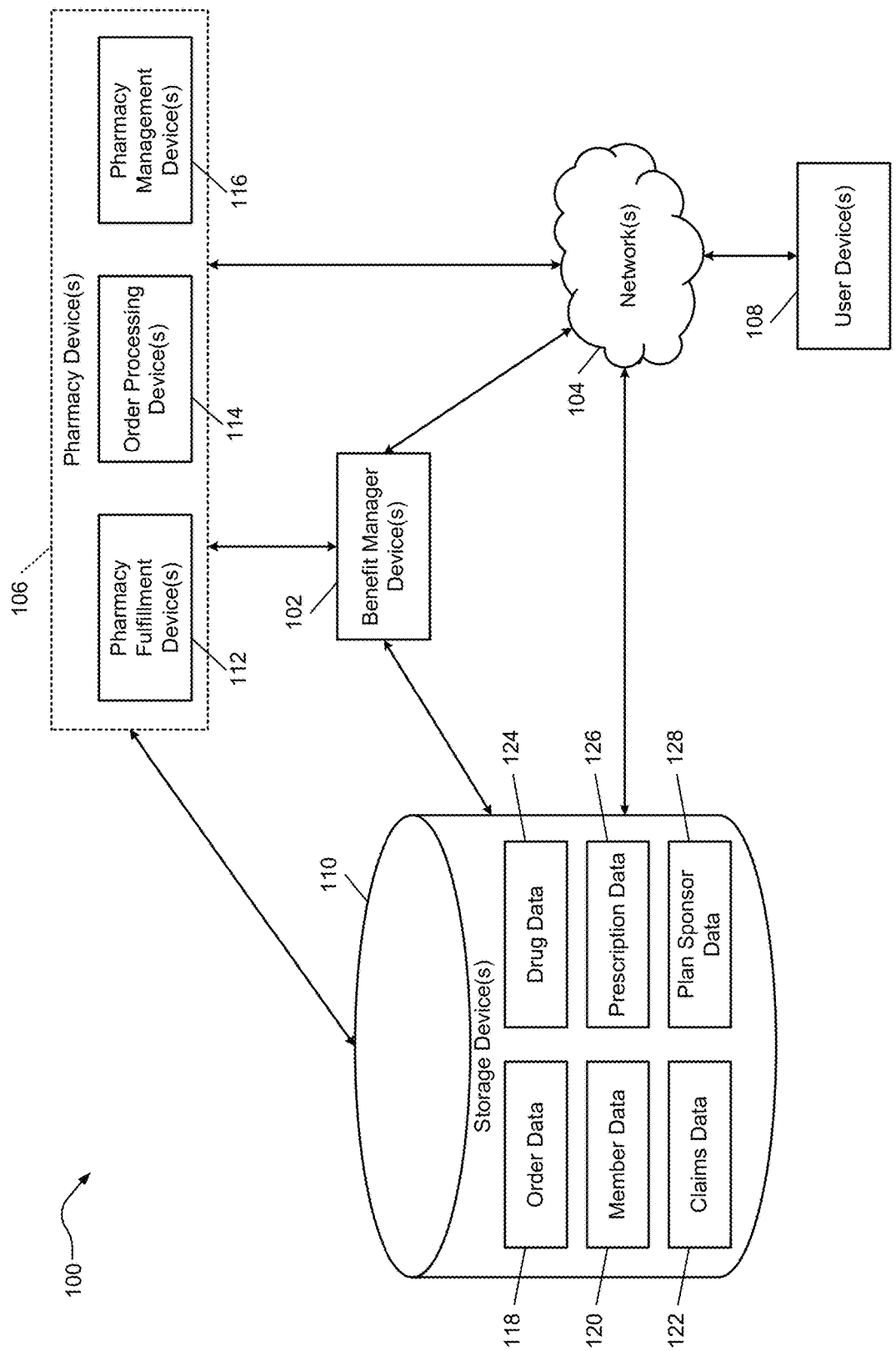
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order.

The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/ or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
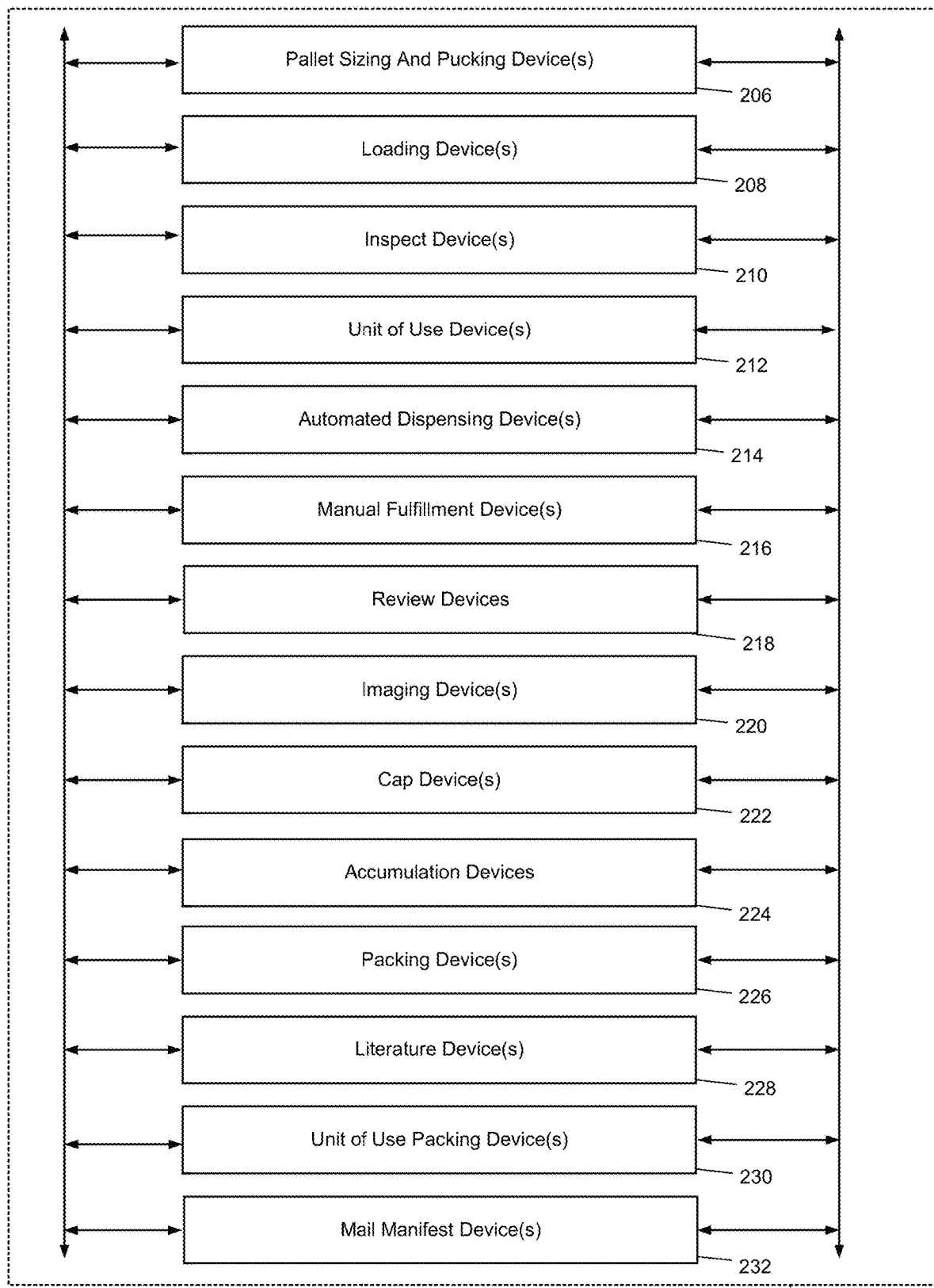
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
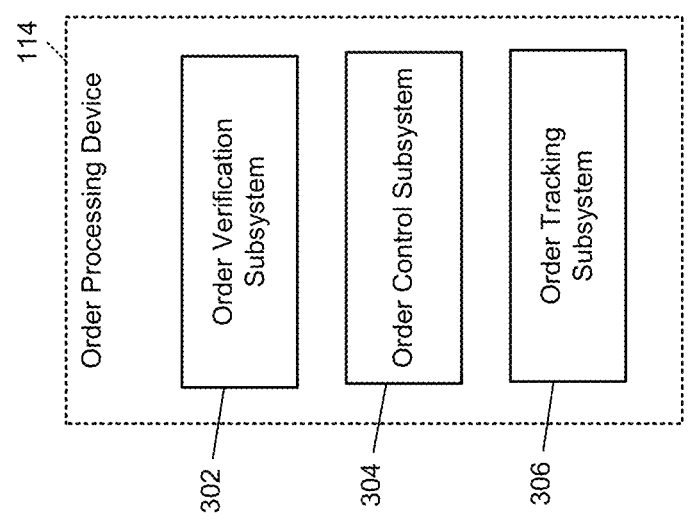
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Data Storage with Homomorphic Encryption

Homomorphic encryption is a form of encryption that allows for computations to be performed on ciphertexts. The computations generate encrypted results that, when decrypted, provide the same value as the result that would occur if the ciphertexts were decrypted prior to performing the computations. For example, if the number '5' is represented by a ciphertext of "t&j345" and the number '7' is represented by a ciphertext of "h1lYu", Equation 1 below illustrates a result of decrypting the ciphertexts prior to adding them together, resulting in a value of '12'. When homomorphic encryption is used as shown in Equation 2, the ciphertexts are added together to produce an encrypted result. Equation 3 shows that when the encrypted result is decrypted, the resulting value of '12' is the same as the result obtained by decrypting the ciphertexts prior to adding them together.

$$5+7=12 \qquad (\text{Eq. 1})$$

$$\text{``}t\&j345\text{''}+\text{``}h1lYu\text{''}=\text{``}39kjwoYP\text{''} \qquad (\text{Eq. 2})$$

$$\text{decrypt}(\text{``}39kjwoYP\text{''})=12 \qquad (\text{Eq. 3})$$

Homomorphic encryption may be used to preserve privacy when outsourcing storage and computation functions. For example, data may be encrypted and outsourced to a commercial cloud environment for processing, while leaving the data encrypted throughout the cloud processing. In highly regulated industries such as healthcare, homomorphic encryption may be used to enable new services, by removing privacy barriers that otherwise inhibit data sharing. For example, it is often difficult to apply predictive analytics in healthcare settings due to medical data privacy concerns; if the predictive analytics service provider can operate on encrypted data instead, the privacy concerns are diminished.

In various implementations, homomorphic encryption is used to make data secure in motion and at rest, even in a third-party-hosted cloud environment. Relevant data may stay encrypted at all times, while still allowing for operations to be performed on the data using homomorphic encryption. Different data types may be protected using different data sensitivity schemas, such as a combination of clear text, encrypted text, homomorphic encrypted text, etc. Example systems described herein may be used in any suitable applications, including healthcare, cloud applications, work from home environments, etc.

An encrypted database may include one or more columns (or rows, etc.), that are specified to use a homomorphic encryption schema. For example, a user may select homomorphic encryption columns, and homomorphic encryption indexes may be used for queries on the homomorphic encryption columns. In various implementations, homomorphic encryption operations may be implemented using a server-side decryption and encryption configuration, a client-side decryption and encryption configuration, etc. Keys for decryption and encryption may be stored, implemented, etc. at the server side or the client side depending on the configuration. For example only, the client side may exist within a web browser.

Example systems described herein may inhibit sensitive data breaches related to medical data, credit card data, etc. For example, homomorphic encryption may be used to provide security for storage of personally identifiable information (PII) and protected health information (PHI). In various implementations, some portions of systems according to the principles of the present disclosure may be implemented in a cloud architecture without requiring any changes to the cloud architecture. Certain homomorphic algorithms, such as Fast Fully Homomorphic Encryption over the Torus (TFHE), may be chosen to optimize speed in production environments.

In various implementations, a system may generate a secret keyset and a cloud keyset. The secret keyset is private and provides encryption/decryption abilities. The cloud keyset may be exported to the cloud, to support operations on homomorphic data. The secret keyset library may be used to encrypt and decrypt data. The encrypted data may be safely outsourced to the cloud to perform secure homomorphic computations.

With homomorphic encryption, operations on data may need to be broken down into a set of Boolean logic, such as using logic gates (for example, some or all of AND gates, OR gates, XOR gates, NOT gates, NAND gates, NOR gates, and XNOR gates). In various implementations, the cloud keyset library may evaluate a netlist of binary gates homomorphically at a rate of about 76 gates per second per core, without decrypting the input. The sequence of gates, as well as ciphertexts of the input bits, may be provided to the cloud keyset library. The library computes ciphertexts of the output bits. The operations to be performed on encrypted data may be referred to as an operation sequence.

If this operation sequence can be created using homomorphic operations (such as a sequence of available logic gates), the operation sequence may be performed homomorphically. Otherwise, the data may be decrypted to allow the operation sequence to be performed on plaintext. The result may then, in some circumstances, be re-encrypted. In various implementations, some portions of the operation sequence may be performed homomorphically while other portions of the operation sequence may be performed on decrypted data. In various implementations, the homomorphic encryption regime may support addition operations but not multiplication operations, resulting in operation sequences relying on addition being performed homomorphically while those portions of operation sequences involving multiplication being performed on decrypted data.

Because homomorphic algorithms may be relatively slower (by one or more orders of magnitude) than normal operations in some situations, example systems may be selective in where the homomorphic algorithms are applied. In various implementations, the homomorphic algorithms may be applied only to sensitive data, such as specific columns of a credit card company's relational database.

As mentioned above, example systems may be used in any suitable applications, such as using homomorphic encryption for PII/PHI data within the healthcare industry. This may alleviate privacy concerns while increasing the ease of integration and use of PII/PHI data. In various implementations, homomorphic encryption may be used in the cloud space to provide increased privacy and functionality for transmission and processing of sensitive data within the cloud environment. Working from home is increasing in popularity, and personal computers in work from home settings are often outside of the protection of corporate protections, including firewalls and other network security. Data may be stored locally in a cleartext format, which may be a tempting target for hackers. Homomorphic encryption may be used to provide enhanced security in these situations while allowing for operations to be performed on the data while it remains in an encrypted state.

Server-Side Configuration

Figure 4:
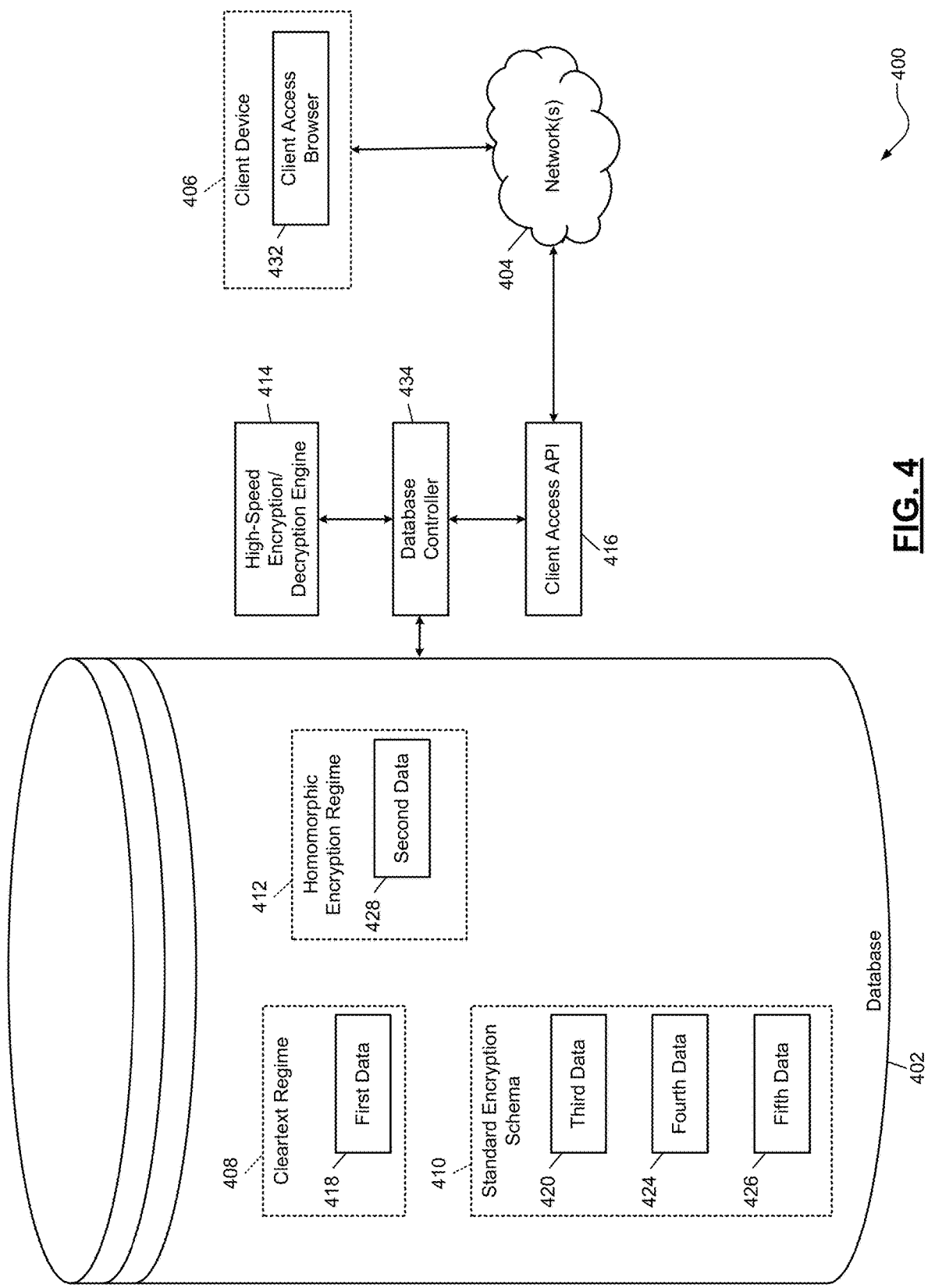
FIG. 4 is a functional block diagram of an example encrypted database system including homomorphic encryption in a server-side configuration.

FIG. 4 is a block diagram of an example implementation of an encrypted database system 400 that uses homomorphic encryption in a server-side configuration. A database 402 is generally described as being deployed in a computer network system, though the database 402 and/or components of the system 400 may otherwise be deployed (for example, as a standalone computer setup, etc.). The system 400 may include a desktop computer, a laptop computer, a tablet, a smartphone, etc. In various implementations, the database 402 may actually be a different form of data store, such as a column store or data warehouse.

As shown in FIG. 4, the database 402 includes a cleartext schema 408, a standard encryption schema 410, and a homomorphic encryption schema 412. Simply for illustration, the cleartext schema 408 is shown to include first data 418, the homomorphic encryption schema 412 is shown to include second data 428, and the standard encryption schema 410 is shown to include third data 420, fourth data 424 and fifth data 426. Though discussed in the context of a database, the data may be stored in other forms, such as column stores, data warehouses, etc.

As described further below, the cleartext schema 408 may include data that is not encrypted and can be displayed in cleartext to authorized users. Authorized users may be allowed to view the first data 418 in cleartext without encryption, such as via the client device 406. The client device 406 may include any suitable device for displaying text and receiving input form a user, such as a desktop computer, a laptop computer, a tablet, a smartphone, etc. The client device 406 may access the database 402 directly or may access the database 402 through one or more networks 404. Examples of the networks 404 include a local area network (LAN), a cellular network, a distributed communications system such as the internet, etc.

The standard encryption schema 410 may include any suitable data that uses standard encryption to inhibit unauthorized persons from viewing the encrypted data, accessing or interpreting the encrypted data, etc.

The homomorphic encryption schema 412 may store data in an encryption format that allows for certain computations to be performed without first decrypting the data. For example, the second data 428 may be stored in an encrypted format using the homomorphic encryption schema 412. The second data 428 may be numeric, and can be adjusted (such as increased or decreased by a set amount) without decryption—instead, the adjustment is performed using homomorphic operations.

In various implementations, selection criteria may be used to determine which schema to use for storing data. For example, in order to reduce computation time, homomorphic encryption may be used for data that meets certain selection criteria, such as sensitive data that may be manipulated by algebraic operations or other suitable processing. Sensitive data may first be identified for use with encryption, and then a determination of whether to use the standard encryption schema 410 or the homomorphic encryption schema 412 may be based on whether it is desirable to perform operations on the data while keeping the data encrypted. Using the homomorphic encryption schema 412 only for selected data may free up computing resources and increase the speed of encryption for data that would not benefit from homomorphic encryption, such as data that is not suitable for algebraic or other types of mathematical operations. As the types of operations that may be used with homomorphic encryption increase over time, the homomorphic encryption schema 412 may be expanded to include developments in homomorphic encryption, including operations that may go beyond algebraic operations such as addition, subtraction, and multiplication.

As shown in FIG. 4, the system 400 includes a database controller 434 and a client access application programming interface (API) 416. The database controller 434 and client access API 416 may allow a client to access the database 402 via the network(s) 404, using a client browser 432 on the client device 406.

FIG. 4 illustrates a server-side configuration where a high-speed encryption/decryption engine 414 is located at the server side, to perform high-speed encryption and decryption operations on data going to and from the database 402. Although FIG. 4 illustrates one example implementation of the database 402, database controller 434, client access API 416, and high-speed encryption/decryption engine 414, in other implementations the database 402, database controller 434, client access API 416, and high-speed encryption/decryption engine 414, may be distributed in any suitable manner across one or more servers, memories, processors, etc.

Figure 5:
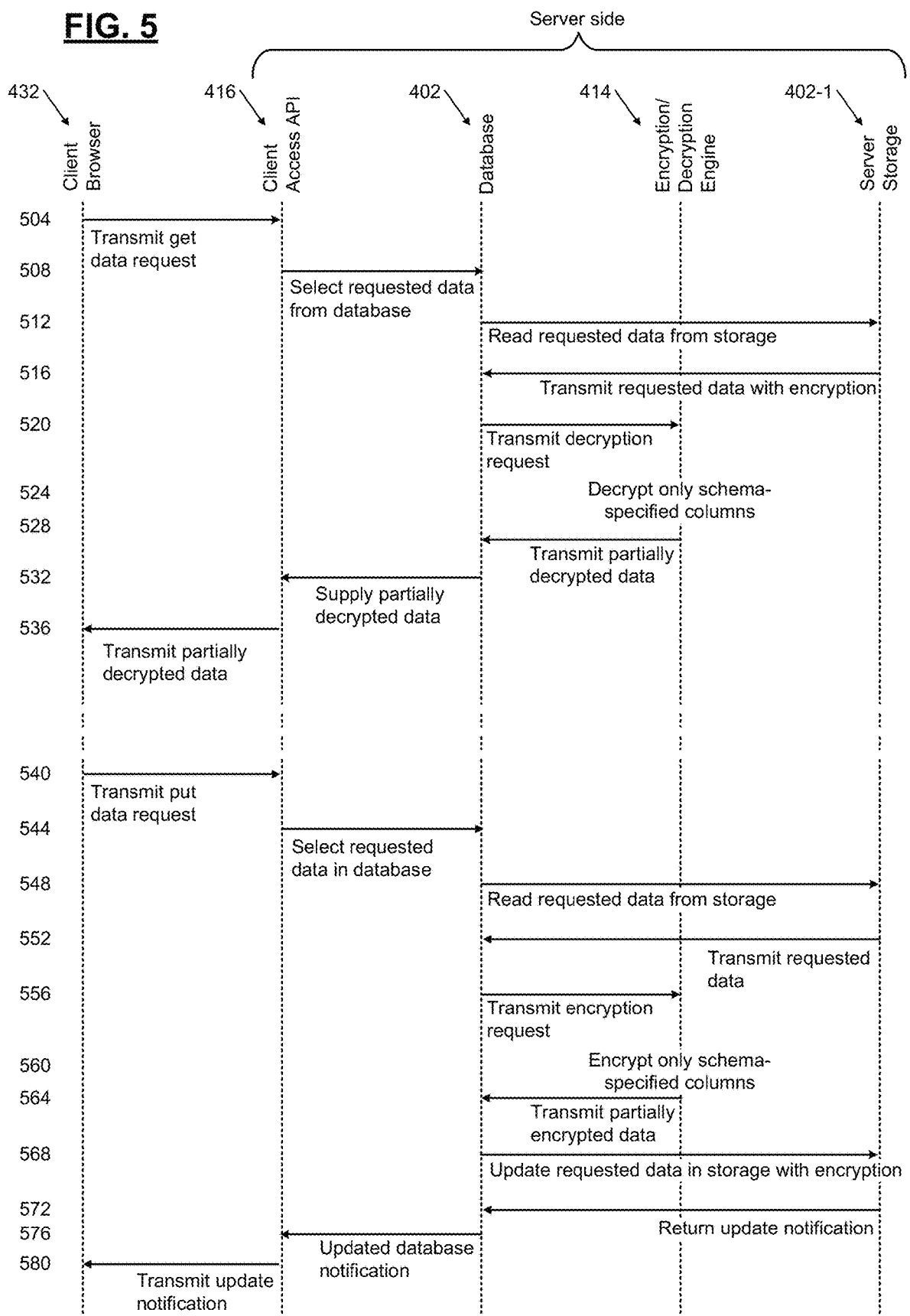
FIG. 5 is a message sequence chart illustrating example interactions between components of the system of FIG. 4.

FIG. 5 is a message sequence chart illustrating example interactions between the client browser 432, the client access API 416, the database 402, the encryption/decryption engine 414, and server storage 402-1, during encryption and decryption processing of data. The server storage 402-1 is represented differently as the actual backing data store for the database 402. The server storage 402-1 may be separate from the database 402, may be part of the database 402, etc.

As shown in FIG. 5, the client access API 416, the database 402, the encryption/decryption engine 414, and the server storage 402-1, may be grouped together as a server-side configuration. At line 504, the client browser 432 transmits a get data request to the client access API 416. At line 508, the client access API 416 selects requested data from the database 402 (e.g., the data specified by the get data request).

At line 512, the database 402 reads the requested data from the server storage 402-1. The server storage 402-1 then transmits the request data with back to the database 402 in an encrypted format, at line 516. At line 520, the database 402 transmits the decryption request to the encryption/decryption engine 414. The encryption/decryption engine 414 then decrypts only the columns in the requested data that are specified as encrypted, at line 524. In various implementations, the encryption/decryption engine 414 (or any other suitable component of the system 400), may perform one or more homomorphic encryption operations on at least a portion of the requested data without decrypting the data.

At line 528, the encryption/decryption engine 414 transmits partially decrypted data back to the server database 402. For example, the data transmitted from the encryption/decryption engine 414 to the database 402 may include some columns that have been decrypted and some columns that remain encrypted. The server database 402 then supplies the partially decrypted data to the client access API 416 at line 532, and the client access API 416 transmits the partially decrypted data to the client browser 432 at line 536.

In various implementations, data may be encrypted for storage via a process illustrated in the lower portion of FIG. 5. For example, the client browser 432 may transmit a put data request to the client access API 416, at line 540. At line 544, the client access API 416 selects requested data from the database 402. At line 548, the database 402 reads the requested data from the server storage 402-1 (e.g., the database 402 obtains the requested data from long-term storage, etc., in order to perform operations on the data or transmit the data to another resource). The server storage 402-1 then transmits the requested data back to the database 402 at line 552.

At line 556, the server database 402 transmits an encryption request to the encryption/decryption engine 414. The encryption/decryption engine 414 encrypts only the columns that are specified for encryption by the relevant schema, at line 560. At line 564, the encryption/decryption engine 414 transmits partially encrypted data back to the database 402. At line 568, the server database 402 stores the encrypted data in the server storage 402-1. The server storage 402-1 then returns an update notification to the database 402 at line 572, and the database 402 supplies an updated database notification to the client access API 416, at line 576. The client access API 416 transmits an update notification to the client browser 432, at line 580.

Client-Side Configuration

Figure 6:
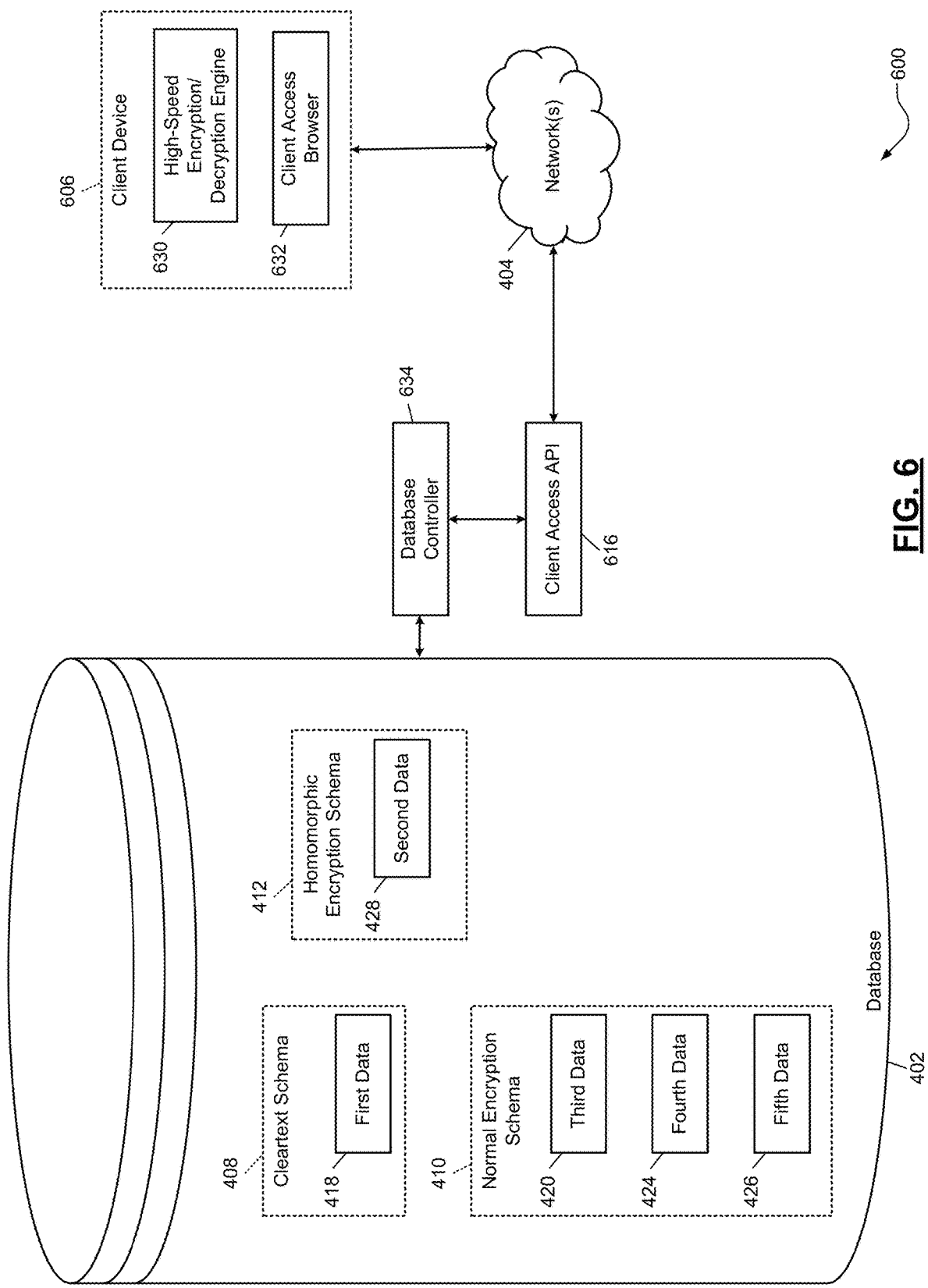
FIG. 6 is a functional block diagram of an example encrypted database system including homomorphic encryption in a client-side configuration.

FIG. 6 is a block diagram of an example implementation of an encrypted database system 600 that uses homomorphic encryption in a client-side configuration. The system 600 is similar to the system 400 of FIG. 4, but uses a client-side configuration where an optional high-speed encryption/decryption engine 630 is located at the client device 606, along with the client browser 632.

As shown in FIG. 6, the database 402 includes a cleartext schema 408, a standard encryption schema 410, and a homomorphic encryption schema 412. Using the previous example, the cleartext schema 408 includes the first data 418, the homomorphic encryption schema 412 includes the second data 428, and the standard encryption schema 410 includes the third data 420, the fourth data 424, and the fifth data 426. Authorized users may be allowed to view the first data 418 in cleartext without encryption, such as via the client device 606.

As shown in FIG. 6, the system 600 includes a database controller 634 and a client access application programming interface (API) 616. The database controller 634 and client access API 616 may allow a client to access the database 402 via the network(s) 404, using a client browser 632 on the client device 606. As mentioned above, FIG. 4 illustrates a client-side configuration where a high-speed encryption/decryption engine 630 is located at the client device 606, to perform high-speed encryption and decryption operations on data at the client device 606. Although FIG. 6 illustrates one example implementation of the database 402, database controller 634, client access API 616 and high-speed encryption/decryption engine 630, in other implementations the database 402, database controller 634, client access API 616, and high-speed encryption/decryption engine 630, may be distributed in any suitable manner across one or more servers, memories, processors, etc.

Figure 7:
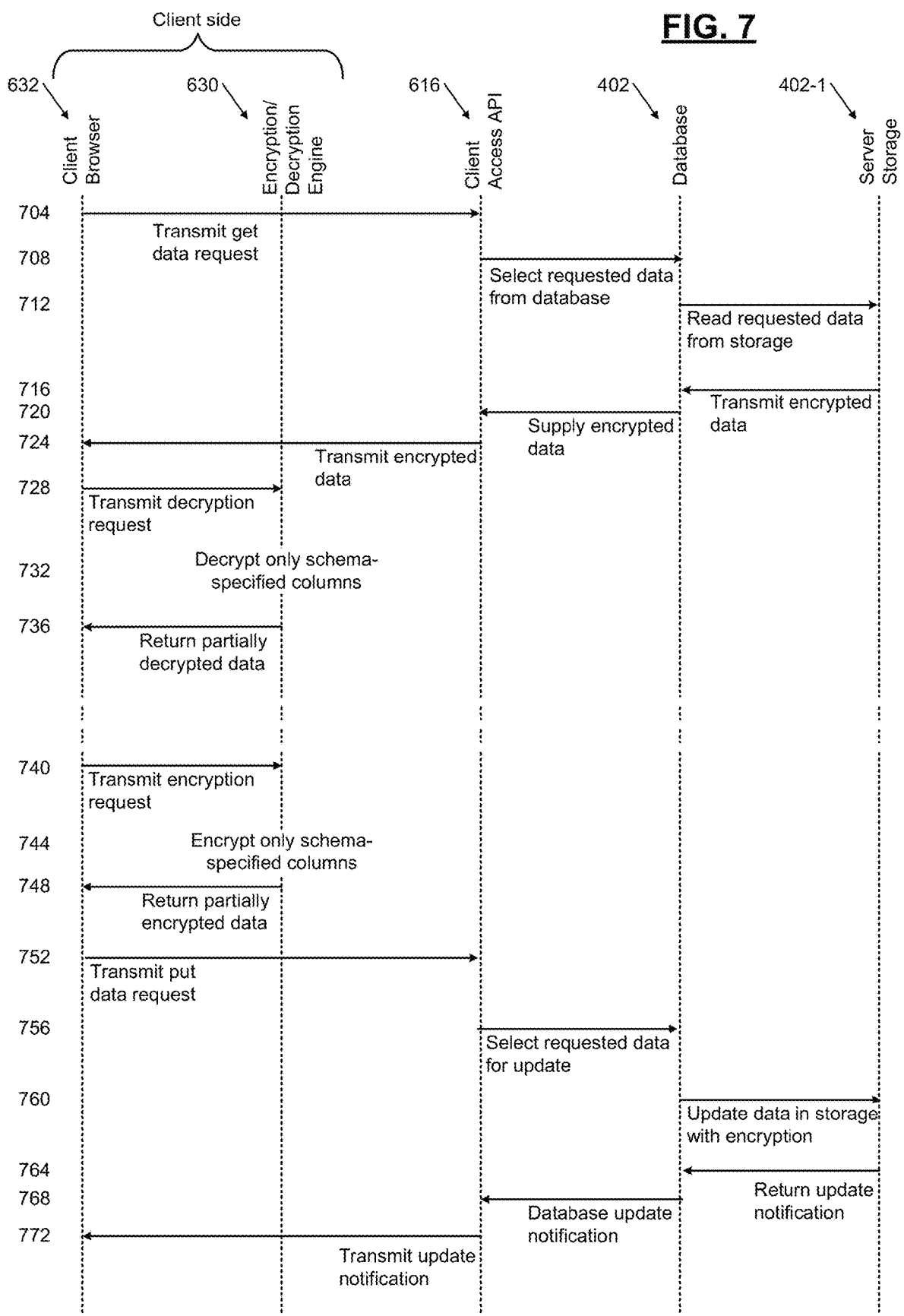
FIG. 7 is message sequence chart illustrating example interactions between components of the system of FIG. 6.

FIG. 7 is example message sequence chart showing interactions between the client browser 632, the encryption/decryption engine 630, the client access API 616, the database 402, and server storage 402-1, during the process of encrypting and decrypting data in the client-side configuration. As shown in FIG. 7, the client browser 632 and encryption/decryption engine 630 may be grouped together as a client-side implementation.

At line 704, the client browser 632 transmits a get data request to the client access API 616. The client access API 616 then selects requested data from the database 402, at line 708. The database 402 reads requested data from server storage 402-1 at line 712, and the server storage 402-1 transmits the encrypted data back to the database 402, at line 716. The database 402 then supplies data to the client access API 616, at line 720.

The client access API 616 transmits encrypted data to the client browser 632 at line 724, and the client browser 632 transmits a decryption request to the encryption/decryption engine 630, at line 728. The encryption/decryption engine 630 then decrypts only the columns specified by the relevant schema, at line 732. Then encryption/decryption engine 630 returns partially decrypted data to the client browser 632, at line 736.

Another example implementation is illustrated in the lower portion of FIG. 7, where data is provided to the system for encryption. For example, at line 740 the client browser 632 transmits an encryption request to the encryption/decryption engine 630. The encryption/decryption engine 630 encrypts only the columns of the data in the encryption request that are specified by the relevant schema, at line 744. Partially encrypted data is returned from the encryption/decryption engine 630 to the client browser 632, at line 748. The client browser 632 then transmits a put data request to the client access API 616, at line 752.

At line 756, the client access API 616 selects the requested data to be updated from the database 402. The database 402 stores the encrypted data in the server storage 402-1, at line 760. The server storage 402-1 returns an update notification to the database 402 at line 764, and the database 402 supplies a database update notification to the client access API 616, at line 768. At line 772, the client access API 616 transmits an update notification to the client browser 432.

Homomorphic Encryption Process

Figure 8:
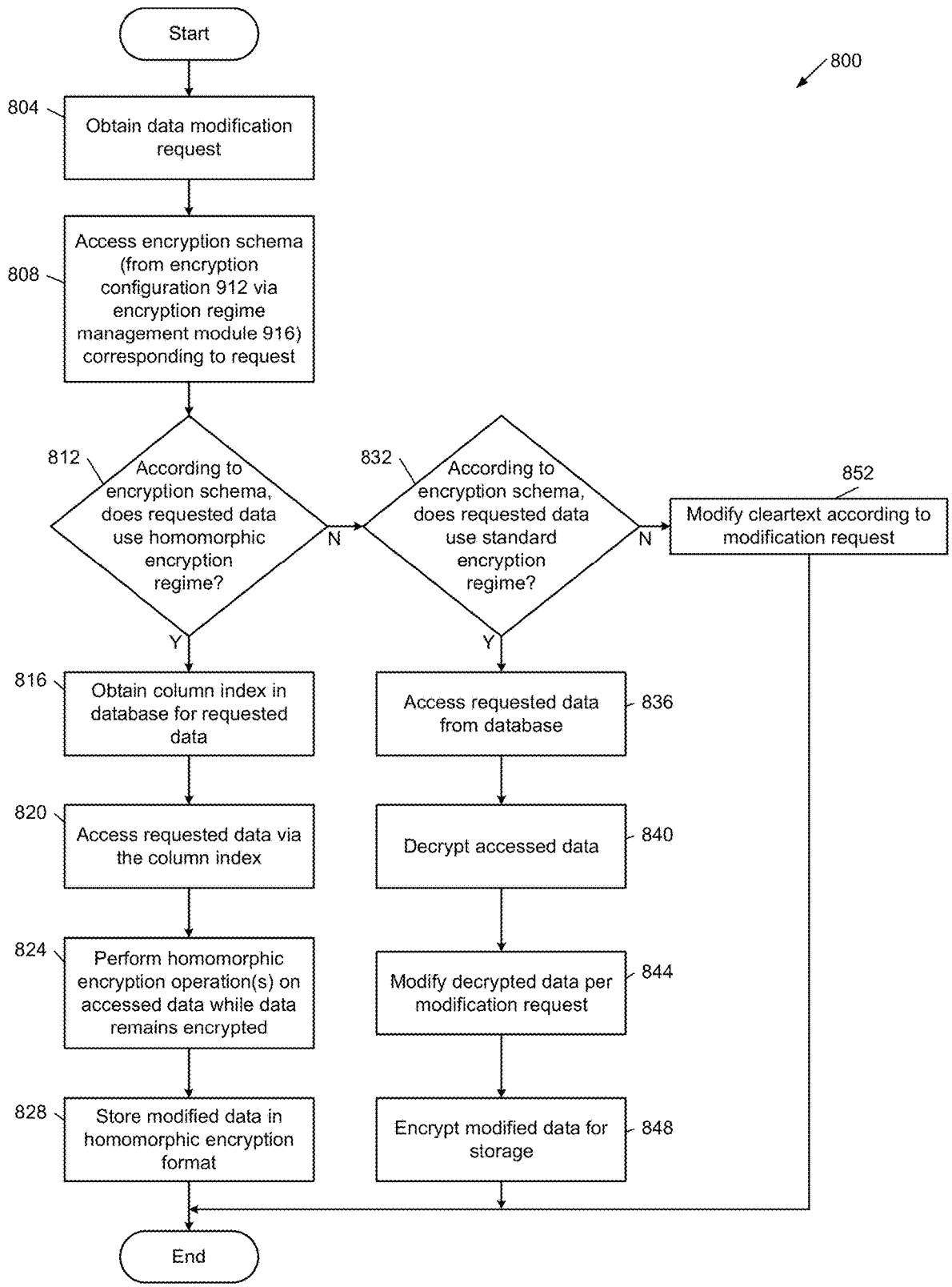
FIG. 8 is a flowchart depicting an example process for modifying encrypted data using homomorphic encryption.

FIG. 8 illustrates an example process 800 for modifying encrypted data using homomorphic encryption. At 804, control begins by obtaining a data modification request (e.g., from a user, from a program, etc.). At 808, control accesses an encryption schema that corresponds to the obtained request. Control then proceeds to 812 to determine whether the requested data uses homomorphic encryption.

If control determines at 812 that the requested data uses homomorphic encryption, control proceeds to 816 to obtain a column index in the database for the requested data. Control then accesses the requested data via the column index at 820, and performs homomorphic encryption operations on the accessed data at 824, while the data remains encrypted. For example, data stored in a homomorphic encryption format may be partially homomorphic, somewhat homomorphic, leveled fully homomorphic, fully homomorphic, etc. In various implementations, computations are represented as either Boolean or arithmetic circuits. Partially homomorphic encryption may encompass schemes that support the evaluation of circuits consisting of only one type of gate, such as addition or multiplication. Somewhat homomorphic encryption schemes may evaluate two types of gates, for a subset of circuits. Leveled fully homomorphic encryption may support the evaluation of arbitrary circuits of bounded (e.g., pre-determined) depth. Fully homomorphic encryption (FHE) may allow for the evaluation of arbitrary circuits of unbounded depth. Once the homomorphic encryption operations are completed, control stores the modified data in the database in a homomorphic encryption format at 828.

If control determines at 812 that the requested data does not use homomorphic encryption, control proceeds to 832 to determine whether the requested data uses standard encryption (that is, traditional non-homomorphic encryption). Example standard encryption techniques include, but are not limited to, symmetric-key cryptography, such as the Advanced Encryption Standard (AES), and public-key cryptography, such as Pretty Good Privacy (PGP).

In various implementations, control may determine whether the requested data uses homomorphic encryption or standard encryption by identifying a schema corresponding to the requested data, by determining an identifier associated with the requested data or a column storing the requested data, by analyzing an encryption format of the requested data, etc. If control determines at 832 that the requested data uses standard encryption, control proceeds to access the requested data from the database at 836. Control then decrypts the accessed data at 840 (for example, by using standard decryption techniques). Control modifies the decrypted data per the obtained modification request, at 844. Control then encrypts the modified data for storage at 848.

If control determines at 832 that the requested data does not use standard encryption (that is, non-homomorphic encryption), control transfers to 852. At 852, control has determined that the requested data does not use homomorphic encryption or standard encryption, and may therefore assume that the requested data is cleartext. Because homomorphic encryption operations and standard encryption operations are not needed on cleartext, control modifies the cleartext according to the modification request. without performing any encryption or decryption.

Simplified Example Schema

As an example only, a set of credit-related data may benefit from the adaptive encryption approach described in this disclosure. Certain fields of the data may be stored in cleartext, certain fields of the data may be stored using standard encryption (such as symmetric and asymmetric schemes), and certain fields of the data may be stored using homomorphic encryption. For example, only the credit-related data may include name, address, age, social security number (SSN), and credit limit. In one example, the name may be stored at a server in cleartext, the address, age, and SSN may be stored at the server using standard encryption (such as with AES, the Advanced Encryption Standard), and the credit limit may be stored at the server using homomorphic encryption.

In various implementations, the server may be the most trusted location (while a client may be, as an example, a user working from home using corporate or personal computing resources). The server may therefore store the keys for encrypting and decrypting the data using standard encryption, as well as the keys for encrypting and decrypting the data using homomorphic encryption. When the server receives cleartext data (from a client or from another server), the server determines which encryption regime to use— none, standard, or homomorphic. If standard or homomorphic, the server then encrypts the data. In various implementations, the received data may already be encrypted upon receipt—the server may decrypt the received data and then re-encrypt using the specified encryption regime.

When the client requests data from the homomorphic regime, the server may provide the data to the client in encrypted form. The client can then perform a set of homomorphic operations on the encrypted data. The server may also be able to perform the same or a different set (or a superset, a subset, etc.) of these homomorphic operations. In addition, the server may be able to encrypt and decrypt the homomorphically-encrypted data. For example, the homomorphic operations may include one or more of additional, subtraction, equality comparison, greater than comparison, less than comparison, and assignment. These operations may be combined in various permutations to accomplish more complicated expressions and equations. In various implementations, a homomorphic regime may supplement or replace the addition operation with a multiplication operation.

In various implementations, the client may be authorized to access the data in the homomorphic regime in either encrypted form or plaintext form, depending on the situation. For example, when the client plans to process the data using operations supported by the homomorphic encryption regime, the data may be provided to the client in encrypted form. However, if the client needs to perform operations not supported by the homomorphic encryption regime, the server may provide the data to the client in plaintext. The client may require different levels of authorization—for example, obtaining the homomorphically-encrypted data may be possible with a first access token, while obtaining the cleartext data may require a second access token. In various implementations, the second access token may only be provided to a client system that meets certain requirements, such as being a corporate device currently connected to the corporate intranet—either directly or through a virtual private network (VPN).

Trust Domain Segmentation

Figure 9:
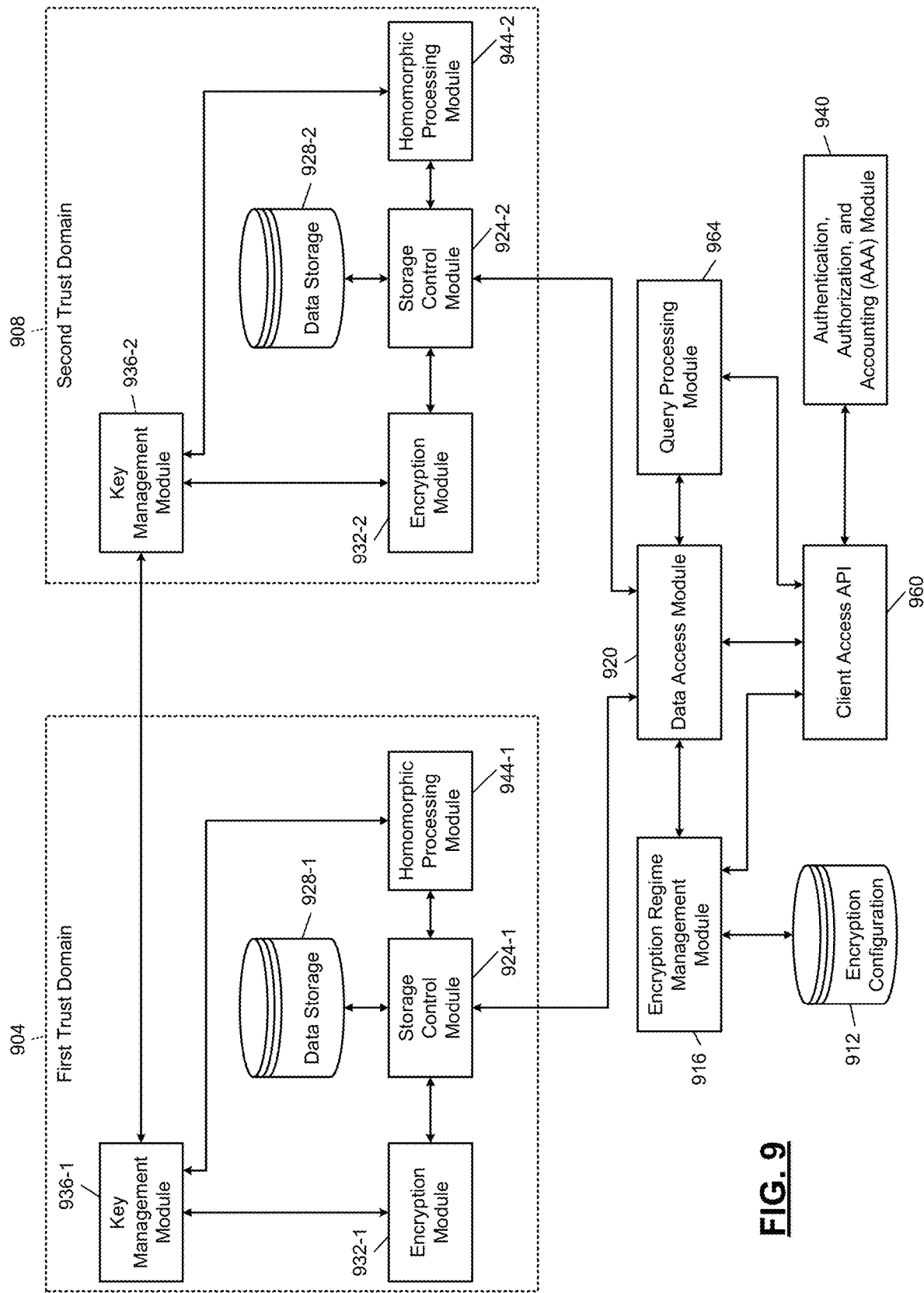
FIG. 9 is a functional block diagram of an example storage system incorporating homomorphic encryption that is segmented across multiple trust domains.

In FIG. 9, a first trust domain 904 and a second trust domain 908 are shown. Though only two are shown, further trust domains may be defined in a system. For example only, the first trust domain 904 may correspond to a data originator that obtains and stores data related to identifiable persons, such as electronic health records (EHRs) or electronic medical records (EMRs). This data may be described as personally identifiable information (PII) and/or protected health information (PHI). As an example, the operator of the first trust domain 904 may be a health insurer, pharmacy benefit manager (PBM), etc. In various implementations, the first trust domain 904 may encompass computer systems (such as servers) owned and administered by the operator at a location of the operator, computer systems located in a third party hosting environment (such as a data center) but administered by the operator, virtualized servers, and a private cloud implementation, such as using Pivotal Cloud Foundry (PCF).

The first trust domain 904 may store the data according to the principles of the present disclosure in an adaptive encryption architecture. An encryption configuration 912 defines how various pieces or types of data are stored. For example, the encryption configuration 912 may define what type of encryption is applied to different fields of a relational database, different columns of a column store, different elements of a data warehouse, etc. For example, the encryption configuration 912 may define an encryption regime for each piece of data.

In various implementations, the encryption regimes may include plaintext (stored unencrypted), symmetric encryption, asymmetric encryption, or homomorphic encryption. The encryption configuration 912 may also store parameters for encryption, such as encryption algorithm, key length, etc. In various implementations, the algorithm specified for homomorphic encryption may define what operations are possible. For example, some homomorphic encryption algorithms possess limitations, such as not supporting addition, not supporting multiplication, or having a limit to how many successive operations can be performed.

The encryption configuration 912 is maintained by an encryption regime management module 916. The encryption regime management module 916 informs a data access module 920 regarding how new data is to be encrypted (on ingest) and how existing data is encrypted (on query or update). The data access module 920 communicates with a storage control module 924-1 in the first trust domain 904 and a storage control module 924-2 in the second trust domain 908. The storage control module 924-1 is an interface to data storage 928-1, while the storage control module 924-2 is an interface to data storage 928-2.

When new data is ingested (from sources not shown), the data access module 920 instructs the storage control module 924-2 what encryption regime to use for each piece of the new data, as specified by the encryption configuration 912. If the data requires encryption, the storage control module 924-1 relies on an encryption module 932-1 to perform the encryption. The encryption module 932-1 consults a key management module 936-1 for the necessary keys to perform encryption. If a key/keyset is not present, the key management module 936-1 can generate and securely store it.

When the storage control module 924-1 needs to return decrypted data, the storage control module 924-1 uses the encryption module 932-1. The encryption module 932-1 may consult an authentication, authorization, and accounting (AAA) module 940 to ensure that the requestor has sufficient access rights to the data to be decrypted. In various implementations, the key management module 936-1 may include a hardware security module (HSM).

In various implementations, the data access module 920 requests that various homomorphic operations be performed on homomorphically-encrypted data. The storage control module 924-1 mediates provision of the homomorphically-encrypted data to a homomorphic processing module 944-1. The homomorphic processing module 944-1 performs homomorphic operations on the encrypted data and may supply updated encrypted data back to the storage control module 924-1 to replace data in the data storage 928-1. Additionally or alternatively, the homomorphic processing module 944-1 may be able to provide results back to the data access module 920 via the storage control module 924-1. For example, these results may arise from performing comparison operations on the encrypted data.

The homomorphic processing module 944-1 may require a key (called an evaluation key) to perform homomorphic operations. This key may be obtained from the key management module 936-1. Evaluation keys may also be shared with the key management module 936-2 so that homomorphic operations can be performed in the second trust domain 908. When public-key encryption algorithms are used, the key management module 936-1 may share public keys to the key management module 936-2 for any private keys securely maintained by the key management module 936-1. An encryption module 932-2 relies on keys maintained by the key management module 936-2.

Keeping data encrypted while in use allows for bifurcating processing between domains of different trust levels. For example, the second trust domain 908 may only be able to perform homomorphic operations (using homomorphic processing module 944-2) on encrypted data while never being able to decrypt the data. The second trust domain 908 may be operated by a third party, such as a medical researcher, a cloud storage provider, a cloud-hosted machine learning algorithm, etc. The nature of the data originator's obligations regarding the PII and PHI data may prevent the sharing of any unencrypted data to such a third party. Using homomorphic encryption may allow the third party to store homomorphically-encrypted versions of the data and perform processing on the data. The third party may be able to obtain useful information from the processing, such as generating predictions from a trained machine-learning model. In other implementations, the result of third-party operations may be encrypted data that can be decrypted for review by the first trust domain 904.

In various implementations, the second trust domain 908 may include services provided by one or more Elastic Cloud Compute (EC2) instances from Amazon Web Services. In such implementations, some or all of the data storage 928-2 may be implemented using Simple Storage Service (S3) from Amazon Web Services. Similarly, the key management module 936-2 may be partly or wholly implemented by Key Management Service (KMS) from Amazon Web Services.

In various implementations, the second trust domain 908 may be operated by a first-party actor, such as a researcher or analyst for the operator of the first trust domain 904. However, to reduce the risk of data exposure while the first-party actor is using the data, homomorphic encryption is used to provide only homomorphically-encrypted data to the first-party actor for processing. The first trust domain 904 may be configured to provide decrypted versions of the data to the first-party actor only when required, and this provision may be subject to strict security requirements. For example, the first-party actor may be permitted to perform homomorphic operations on encrypted data using a personal device. However, to gain access to decrypted data, the first-party actor must use certain designated devices administered by the data originator and present within the firewall boundary of the data originator.

In various implementations, the first trust domain 904 may withhold providing sensitive data (such as PII/PHI) to the second trust domain 908 in unencrypted form. Instead, the first trust domain 904 may provide sensitive data encrypted according to standard encryption regimes to the second trust domain 908 without providing the private keys (or, for symmetric encryption, the decryption keys) for decrypting the encrypted sensitive data. In this situation, the second trust domain 908 would simply act as storage, with no ability to process the encrypted data.

The first trust domain 904, even if a trusted first party that originated the sensitive data, may still store some or all sensitive data in homomorphically-encrypted form. For such implementations, the homomorphic processing module 944-1 is shown in FIG. 9. The first trust domain 904 can then perform some processing without ever decrypting the data and exposing it to a security breach.

A user may access the first trust domain 904 and/or the second trust domain 908 via a client access application programming interface (API) 960. For example, the user may make a query to the client access API 960, which consults with the encryption regime management module 916 to determine where the necessary data is stored and what encryption is applicable. A query processing module 964 may work to combine results from across the first trust domain 904 and the second trust domain 908 in response to the query. For example only, homomorphic operations may be performed in the second trust domain 908 in response to the query. Meanwhile, operations that cannot be practicably performed homomorphically (for example, based on the relative slow speed of homomorphic operations) may be performed in the first trust domain 904 by decrypting the data, performing the operations, and then re-encrypting the data.

While various modules are shown outside of either dashed box, each may be part of the first trust domain 904 or the second trust domain 908, or they may be part of a third trust domain. For example, if the query processing module 964 needs to combine unencrypted data present within the first trust domain 904, then some or all of the query processing module 964 may be implemented within the first trust domain 904. When the second trust domain 908 is operated by a third party, users at the third party may have a different interface (not shown) to the storage control module 924-2 for performing processing and queries.

In various implementations, the encryption configuration 912 is designed to not be static. In other words, data stored using symmetric encryption may, at some point, be converted into data stored using homomorphic encryption. When this occurs, the encryption regime management module 916 may instruct the data access module 920 to instruct the respective storage control modules 924-1 and 924-2 to obtain, decrypt, and re-encrypt the affected data. Such a change in encryption may be controlled by the client access API 960 or through another route, such as by a systems architect. The change may be the result of certain operations becoming available or faster in the homomorphic encryption regime, and therefore the data would still be usable even when encrypted homomorphically. In other situations, a use case arises for a third party, such as the operator of the second trust domain 908, to perform homomorphic operations on certain data that previously was not shared with the second trust domain 908.

Conclusion

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements as well as an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module."

The term "module" may refer to, be part of, or include processor hardware (shared, dedicated, or group) that executes code and memory hardware (shared, dedicated, or group) that stores code executed by the processor hardware.

The module may include one or more interface circuit(s). In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A computerized method of querying a cryptographic data store, the method comprising:
   maintaining an encryption configuration data structure in a non-transitory computer-readable medium;
   receiving a first query from a first requestor via an application programming interface (API);
   identifying first data required for the first query;
   determining, by consulting the encryption configuration data structure, a first encryption regime for the first data, wherein the first encryption regime is one of: a symmetric encryption regime associated with a symmetric key, an asymmetric encryption regime associated with a public key and a private key, a plaintext regime, and a homomorphic encryption regime associated with a first key; and
   in response to the first encryption regime being a homomorphic encryption regime:
      determining an operation sequence specified by the first query for performance on the first data;
      determining, by consulting the encryption configuration data structure, whether the operation sequence is supported by the first encryption regime;
      in response to a determination that the operation sequence is supported, commissioning homomorphic execution of the operation sequence on the first data to generate encrypted output data;
      in response to a determination that the operation sequence is not supported, selectively commissioning decryption of the first data using the first key to generate decrypted data, execution of the operation sequence on the decrypted data to generate unencrypted output data, and re-encryption of the unencrypted output data using the first key to generate encrypted output data; and
      selectively returning the encrypted output data to the first requestor via the API in response to the first query.

2. The method of claim 1 further comprising ingesting source data, prior to receiving the first query, by:
   determining, by consulting the encryption configuration data structure, a specified encryption regime for the source data, wherein the specified encryption regime is one of the symmetric encryption regime, the asymmetric encryption regime, the plaintext regime, and the homomorphic encryption regime; and
   in response to the specified encryption regime being the homomorphic encryption regime, encrypting the source data with the first key to generate the first data.

3. The method of claim 2 further comprising:
   in response to the specified encryption regime being the symmetric encryption regime, encrypting the source data with the symmetric key to generate the first data;
   in response to the specified encryption regime being the asymmetric encryption regime, encrypting the source data the public key to generate the first data;
   in response to the specified encryption regime being the plaintext regime, selectively modifying the source data by applying extract, transform, and load actions and storing the source data, as modified, as the first data.

4. The method of claim 3 wherein:
   the source data originated with a first party;
   the first party controls the first key, the symmetric key, and the private key; and
   the method further includes selectively transmitting the first data to a third party.

5. The method of claim 4 wherein the transmitting the first data to the third party includes withholding the first key, the symmetric key, and the private key from the third party.

6. The method of claim 2 wherein:
   the source data originated with a first party;
   the first party controls the first key; and
   the method further includes selectively transmitting the first data to a third party.

7. The method of claim 6 wherein the transmitting the first data to the third party includes withholding the first key from the third party.

8. The method of claim 6 wherein the transmitting the first data to the third party includes selectively providing an evaluation key related to the first key to the third party.

9. The method of claim 6 wherein:
   the homomorphic execution of the operation sequence is performed by the third party; and
   the decryption of the first data is performed by the first party.

10. The method of claim 1 further comprising:
    selectively transmitting a request to an authentication, authorization, and accounting (AAA) service, wherein the request specifies the first requestor and the first data; and
    in response to a successful authorization response by the AAA service, decrypting the encrypted output data and returning the decrypted output data to the first requestor via the API in response to the first query.

11. The method of claim 1 wherein:
    the operation sequence encodes a trained machine learning model; and
    the encrypted output data represents a predicted outcome from the trained machine learning model in response to the first data.

12. The method of claim 11 wherein the trained machine learning model is encoded using homomorphic operations.

13. The method of claim 1 further comprising, in response to receiving a change request specifying second data and a subsequent encryption regime:
    determining, by consulting the encryption configuration data structure, an existing encryption regime for the second data, wherein the existing encryption regime is one of the symmetric encryption regime, the asymmetric encryption regime, the plaintext regime, and the homomorphic encryption regime; and
    in response to the existing encryption regime being the symmetric encryption regime, the asymmetric encryption regime, or the homomorphic encryption regime:
       decrypting the second data; and
       updating the encryption configuration data structure to reflect the subsequent encryption regime for the second data.

14. The method of claim 13 further comprising, subsequent to decrypting the second data:
    in response to the subsequent encryption regime being a symmetric encryption regime, an asymmetric encryption regime, or a homomorphic encryption regime, encrypting the decrypted second data according to the subsequent encryption regime.

15. The method of claim 1 wherein the operation sequence includes one or more algebraic or mathematical operations.

16. A cryptographic storage system comprising:
    memory hardware configured to store instructions; and
    processing hardware configured to execute the instructions stored by the memory hardware, wherein the instructions include:

maintaining an encryption configuration data structure;
receiving a first query from a first requestor via an application programming interface (API);
identifying first data required for the first query;
determining, by consulting the encryption configuration data structure, a first encryption regime for the first data, wherein the first encryption regime is one of: a symmetric encryption regime associated with a symmetric key, an asymmetric encryption regime associated with a public key and a private key, a plaintext regime, and a homomorphic encryption regime associated with a first key; and
in response to the first encryption regime being a homomorphic encryption regime:
  determining an operation sequence specified by the first query for performance on the first data;
  determining, by consulting the encryption configuration data structure, whether the operation sequence is supported by the first encryption regime;
  in response to a determination that the operation sequence is supported, commissioning homomorphic execution of the operation sequence on the first data to generate encrypted output data;
  in response to a determination that the operation sequence is not supported, selectively commissioning decryption of the first data using the first key to generate decrypted data, execution of the operation sequence on the decrypted data to generate unencrypted output data, and re-encryption of the unencrypted output data using the first key to generate encrypted output data; and
  selectively returning the encrypted output data to the first requestor via the API in response to the first query.

17. The system of claim 16 wherein the instructions further include ingesting source data, prior to receiving the first query, by:
  determining, by consulting the encryption configuration data structure, a specified encryption regime for the source data, wherein the specified encryption regime is one of the symmetric encryption regime, the asymmetric encryption regime, the plaintext regime, and the homomorphic encryption regime;
  in response to the specified encryption regime being the homomorphic encryption regime, encrypting the source data with the first key to generate the first data;
  in response to the specified encryption regime being the symmetric encryption regime, encrypting the source data the symmetric key to generate the first data;
  in response to the specified encryption regime being the asymmetric encryption regime, encrypting the source data the public key to generate the first data; and
  in response to the specified encryption regime being a plaintext regime, using the first key, selectively modifying the source data by applying extract, transform, and load actions and storing the source data, as modified, as the first data.

18. The system of claim 17 wherein:
the source data originated with a first party;
the first party controls the first key, the symmetric key, and the private key;
the instructions further include selectively transmitting the first data to a third party; and
the transmitting the first data to the third party includes withholding the first key, the symmetric key, and the private key from the third party.

19. A non-transitory computer-readable medium comprising instructions executable by processor hardware, wherein the instructions include:
maintaining an encryption configuration data structure;
receiving a first query from a first requestor via an application programming interface (API);
identifying first data required for the first query;
determining, by consulting the encryption configuration data structure, a first encryption regime for the first data, wherein the first encryption regime is one of: a symmetric encryption regime associated with a symmetric key, an asymmetric encryption regime associated with a public key and a private key, a plaintext regime, and a homomorphic encryption regime associated with a first key; and
in response to the first encryption regime being a homomorphic encryption regime:
  determining an operation sequence specified by the first query for performance on the first data;
  determining, by consulting the encryption configuration data structure, whether the operation sequence is supported by the first encryption regime;
  in response to a determination that the operation sequence is supported, commissioning homomorphic execution of the operation sequence on the first data to generate encrypted output data;
  in response to a determination that the operation sequence is not supported, selectively commissioning decryption of the first data using the first key to generate decrypted data, execution of the operation sequence on the decrypted data to generate unencrypted output data, and re-encryption of the unencrypted output data using the first key to generate encrypted output data; and
  selectively returning the encrypted output data to the first requestor via the API in response to the first query.

20. The non-transitory computer-readable medium of claim 19 wherein the instructions further include ingesting source data, prior to receiving the first query, by:
  determining, by consulting the encryption configuration data structure, a specified encryption regime for the source data, wherein the specified encryption regime is one of the symmetric encryption regime, the asymmetric encryption regime, the plaintext regime, and the homomorphic encryption regime;
  in response to the specified encryption regime being the homomorphic encryption regime, encrypting the source data with the first key to generate the first data;
  in response to the specified encryption regime being the symmetric encryption regime, encrypting the source data with the symmetric key to generate the first data;
  in response to the specified encryption regime being the asymmetric encryption regime, encrypting the source data with the public key to generate the first data; and
  in response to the specified encryption regime being the plaintext regime, selectively modifying the source data by applying extract, transform, and load actions and storing the source data, as modified, as the first data.

21. The non-transitory computer-readable medium of claim 20 wherein:
the source data originated with a first party;
the first party controls the first key, the symmetric key, and the private key;

the instructions further include selectively transmitting the first data to a third party; and the transmitting the first data to the third party includes withholding the first key, the symmetric key, and the private key from the third party.

\* \* \* \* \*